US009488748B2

(12) United States Patent
Bloemenkamp

(10) Patent No.: US 9,488,748 B2
(45) Date of Patent: Nov. 8, 2016

(54) SYSTEM AND METHOD FOR GENERATING FLUID COMPENSATED DOWNHOLE PARAMETERS

(75) Inventor: Richard Bloemenkamp, Issy-les-Moulineaux (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 84 days.

(21) Appl. No.: 14/116,126
(22) PCT Filed: May 11, 2012
(86) PCT No.: PCT/EP2012/058763
§ 371 (c)(1),
(2), (4) Date: Nov. 6, 2013
(87) PCT Pub. No.: WO2012/152916
PCT Pub. Date: Nov. 15, 2012

(65) Prior Publication Data
US 2014/0062487 A1    Mar. 6, 2014

(30) Foreign Application Priority Data
May 11, 2011    (EP) .................... 11305573

(51) Int. Cl.
G01V 3/20    (2006.01)
G01V 3/24    (2006.01)
(Continued)

(52) U.S. Cl.
CPC ............... *G01V 3/20* (2013.01); *E21B 49/005* (2013.01); *E21B 49/10* (2013.01); *G01V 3/24* (2013.01)

(58) Field of Classification Search
CPC .... E21B 49/005; E21B 49/10; E21B 49/081; E21B 49/082; E21B 49/086; G01V 3/20; G01V 3/24; G01V 3/28; G01V 3/18
See application file for complete search history.

(56) References Cited

U.S. PATENT DOCUMENTS 2,392,357 A    1/1946    Bays
2,395,617 A    2/1946    Henri
(Continued)

FOREIGN PATENT DOCUMENTS

EP    2182391    5/2010
EP    2362210    8/2011
(Continued)

OTHER PUBLICATIONS

C. Tyrrell, N.B. Joshi, "The Role of Subsea Sampling in Multiphase Metering," The Americas Workshop Feb. 3-5, 2008.
(Continued)

Primary Examiner — Minh N Tang
Assistant Examiner — David Frederiksen
(74) Attorney, Agent, or Firm — Michael Dae

(57) ABSTRACT

Systems, tools and techniques for generating downhole parameters of a wellbore penetrating a subterranean formation and having a downhole fluid (108) therein are provided. A downhole tool with sensor pads (118a, 118b, 118c, 118d) is positioned in the wellbore (106) for emitting an electrical signal therefrom and for measuring the electrical signal. A downhole fluid unit is provided for generating downhole fluid measurements from the measured electrical signal passing through the downhole fluid and for generating a downhole fluid distribution profile (430) based on the downhole fluid measurements whereby separation of the downhole fluid may be indicated. A formation unit may be provided for generating formation measurements from the measured electrical signal passing through the subterranean formation. A compensation unit may be provided for analyzing the fluid distribution profile and selectively adjusting the formation measurements based on the analyzed downhole fluid distribution profile whereby a fluid compensated formation parameter is provided.

15 Claims, 6 Drawing Sheets

(51) Int. Cl.
*E21B 49/00* (2006.01)
*E21B 49/10* (2006.01)

(56) References Cited

U.S. PATENT DOCUMENTS

| | | | |
|---|---|---|---|
| 2,669,689 A | 2/1954 | Henri | |
| 5,551,287 A * | 9/1996 | Maute et al. | 73/152.02 |
| 5,661,237 A | 8/1997 | Dussan et al. | |
| 5,829,520 A * | 11/1998 | Johnson | E21B 43/086 |
| | | | 166/250.01 |
| 6,167,965 B1 * | 1/2001 | Bearden et al. | 166/250.15 |
| 6,435,279 B1 | 8/2002 | Howe et al. | |
| 6,467,544 B1 | 10/2002 | Brown et al. | |
| 6,659,177 B2 | 12/2003 | Bolze et al. | |
| 6,801,039 B2 | 10/2004 | Fabris et al. | |
| 7,066,282 B2 | 6/2006 | Chen et al. | |
| 7,243,536 B2 | 7/2007 | Bolze | |
| 7,394,258 B2 | 7/2008 | Itskovich et al. | |
| 7,397,250 B2 | 7/2008 | Bespalov et al. | |
| 2004/0188140 A1 * | 9/2004 | Chen et al. | 175/17 |
| 2004/0262008 A1 | 12/2004 | Deans et al. | |
| 2006/0155474 A1 | 7/2006 | Venkataramanan et al. | |
| 2007/0035305 A1 | 2/2007 | Itskovich et al. | |
| 2007/0143023 A1 | 6/2007 | Betancourt et al. | |
| 2007/0274842 A1 | 11/2007 | Campen et al. | |
| 2008/0135239 A1 | 6/2008 | Edwards | |
| 2008/0234938 A1 * | 9/2008 | Niemeyer et al. | 702/11 |
| 2008/0288171 A1 | 11/2008 | Itskovich et al. | |
| 2009/0159260 A1 * | 6/2009 | Ikeda | E21B 43/38 |
| | | | 166/53 |
| 2009/0288836 A1 | 11/2009 | Goodall et al. | |
| 2009/0288881 A1 * | 11/2009 | Mullins | E21B 47/022 |
| | | | 175/50 |
| 2010/0059221 A1 | 3/2010 | Vannuffelen et al. | |
| 2010/0067329 A1 * | 3/2010 | Edwards | E21B 21/08 |
| | | | 367/82 |
| 2010/0312477 A1 * | 12/2010 | Sanstrom | G01V 11/00 |
| | | | 702/6 |
| 2011/0005765 A1 | 1/2011 | Cumming et al. | |
| 2011/0114309 A1 | 5/2011 | Bloemenkamp et al. | |
| 2012/0000658 A1 * | 1/2012 | Coludrovich, III | E21B 21/00 |
| | | | 166/305.1 |
| 2012/0119744 A1 | 5/2012 | Habashy et al. | |

FOREIGN PATENT DOCUMENTS

| | | |
|---|---|---|
| EP | 2385366 | 11/2011 |
| WO | 03/016826 | 2/2003 |
| WO | 2010106499 | 9/2010 |
| WO | 2010106500 | 9/2010 |

OTHER PUBLICATIONS

P.A., Patil, et al., "Experimental Study of Electrical Properties of Oil-Based Mud in the Frequency Range From I to 100 MHz," SPE Drilling & Completion Sep. 2010.

* cited by examiner

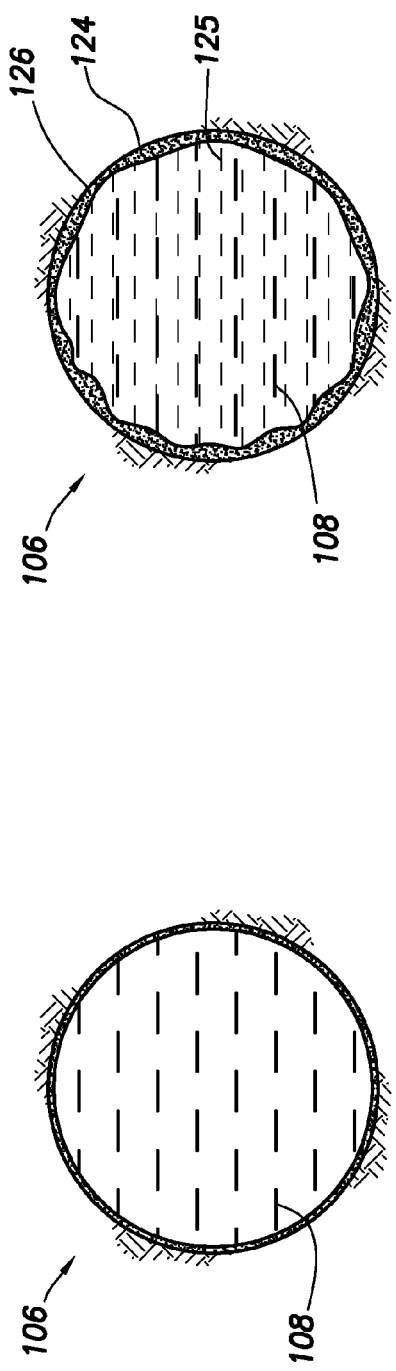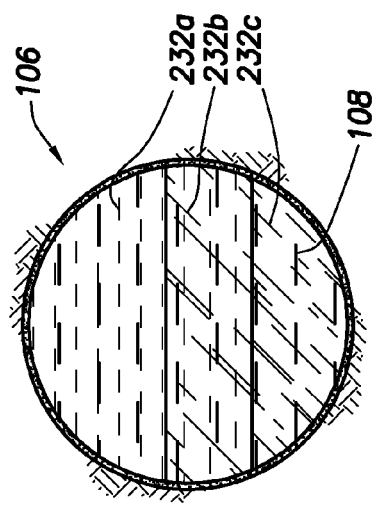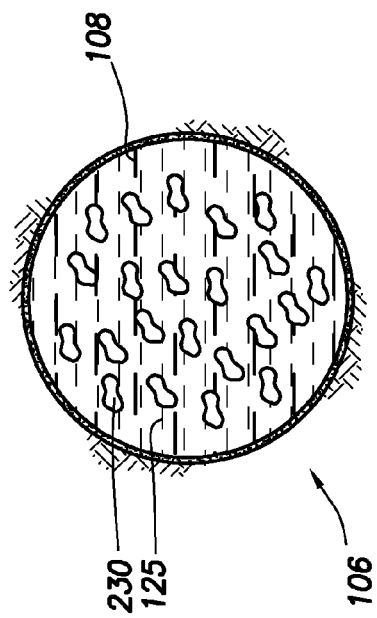

SYSTEM AND METHOD FOR GENERATING FLUID COMPENSATED DOWNHOLE PARAMETERS

BACKGROUND OF THE INVENTION

1. Field of the Invention

The invention relates to techniques for performing wellbore operations. More particularly, the invention relates to techniques for determining downhole parameters of, for example, downhole fluids and/or subterranean formations.

2. Background of the Related Art

Oil rigs are positioned at wellsites for performing a variety of oilfield operations, such as drilling a wellbore, performing downhole testing and producing located hydrocarbons. Downhole drilling tools are advanced into the earth from a surface rig to form a wellbore. Downhole fluids are often pumped into the wellbore as the drilling tool advances into the earth. The downhole fluids may be used, for example, to remove cuttings, to cool a drill bit at the end of the drilling tool and/or to provide a protective lining along a wall of the wellbore. During or after drilling, casing is typically cemented into place to line at least a portion of the wellbore. Once the wellbore is formed, production tools may be positioned about the wellbore to draw fluids to the surface.

During drilling, measurements may be taken to determine wellsite conditions. In some cases, the drilling tool may be removed so that a wireline testing tool may be lowered into the wellbore to take additional measurements and/or to sample downhole fluids. Downhole measurements taken by drilling, testing, production and/or other wellsite tools may be used to determine downhole conditions and/or to assist in locating subsurface reservoirs containing valuable hydrocarbons. Such wellsite tools may be used to measure and/or determine downhole parameters, such as temperature, pressure, viscosity, resistivity, etc. Such measurements may be useful in directing the oilfield operations and/or for analyzing downhole conditions.

Some measurement techniques have been developed for positioning sensor pads in a wellbore to take downhole measurements as described, for example, in Patent/Application Nos. US20080288171, and EP2182391. Some downhole measurements may be used to measure parameters of downhole fluids as described, for example, in U.S. Pat. No. 7,066,282, U.S. Pat. No. 7,394,258, U.S. Pat. No. 7,397,250, U.S. Pat. No. 6,801,039, and EP2182391.

Despite the development of techniques for measuring downhole parameters, there remains a need to provide advanced techniques for determining parameters of downhole fluids and/or subterranean formations. It is desirable that such techniques take into consideration the wellbore conditions that may affect downhole measurements. The invention is directed at achieving these techniques.

SUMMARY OF THE INVENTION

The invention relates to a system for generating downhole parameters of a wellbore penetrating a subterranean formation and having a downhole fluid therein. The system has a downhole tool positionable in the wellbore, sensor pads positionable about the downhole tool for emitting an electrical signal therefrom and for measuring the electrical signal, and a downhole fluid unit for generating downhole fluid measurements from the measured electrical signal passing through the downhole fluid and generating a downhole fluid distribution profile based on the downhole fluid measurements whereby separation of the downhole fluid may be indicated.

The system may also have a formation unit for generating at least one formation measurement from the measured electrical signal passing through the subterranean formation, and a compensation unit for analyzing the downhole fluid distribution profile and selectively adjusting the formation measurements based on the analyzed downhole fluid distribution profile whereby a fluid compensated formation parameter is provided. The system may also be provided with at least one sensor for measuring at least one wellbore measurement, such as an electrical, acoustic, nuclear, temperature, and pressure.

The invention also relates to a method for generating downhole parameters of a wellbore penetrating a subterranean formation and having a downhole fluid therein. The method involves positioning a downhole tool in the wellbore (the downhole tool having a plurality of sensor pads thereon), positioning the sensor pads adjacent a wall of the wellbore, emitting an electrical signal from the sensor pads, measuring the electrical signal with the sensor pads, generating downhole fluid measurements from the measured electrical signal, and generating a downhole fluid distribution profile based on the downhole fluid measurements.

The method may also involve generating at least one formation measurement from the measured electrical signal, and generating at least one downhole fluid compensated formation measurement by analyzing the downhole fluid distribution profile and selectively adjusting the formation measurement based on the analyzed downhole fluid distribution profile.

The step of generating downhole fluid compensated formation parameter may involve determining if any of the downhole fluid measurements is outside of an expected range and selectively deleting any of the downhole fluid measurements that is outside of an expected range, repeating the steps of the method at a new location in the wellbore, and/or changing the sensor pads and repeating the steps of the method. The method may also involve measuring at least one wellbore measurement with at least one sensor.

The step of measuring may involve performing an indirect measurement of the downhole fluid. The step of measuring may be performed over time. The step of generating a downhole fluid distribution profile may involve converting the electrical signal into a fluid loss tangent and/or converting the electrical signal into an oil/water ratio.

BRIEF DESCRIPTION OF THE DRAWINGS

The embodiments may be better understood, and numerous objects, features, and advantages made apparent to those skilled in the art by referencing the accompanying drawings. These drawings are used to illustrate only typical embodiments of this invention, and are not to be considered limiting of its scope, as the invention may admit to other equally effective embodiments. The figures are not necessarily to scale and certain features and certain views of the figures may be shown exaggerated in scale or in schematic in the interest of clarity and conciseness.

FIGS. 2A-2D are schematic cross-sectional views of the wellbore of FIG. 1 taken at various depths along lines 2A-2A, 2B-2B, 2C-2C and 2D-2D, respectively.

DETAILED DESCRIPTION

The description that follows includes exemplary apparatus, methods, techniques, and/or instruction sequences that embody techniques of the inventive subject matter. However, it is understood that the described embodiments may be practiced without these specific details. Presently preferred embodiments of the invention are shown in the above-identified Figures and described in detail below.

The invention described herein is directed at techniques for measuring downhole parameters of a wellsite, such as parameters relating to downhole fluids and/or subterranean formations. Such techniques may involve detecting and/or compensating for conditions that may affect downhole measurements, such as a distribution of the mud and/or other downhole fluids about the wellbore. In particular, measurements taken by certain sensors positioned about portions of the wellbore may be compensated (or adjusted) to take into consideration the effects of downhole fluids.

Figure 1:
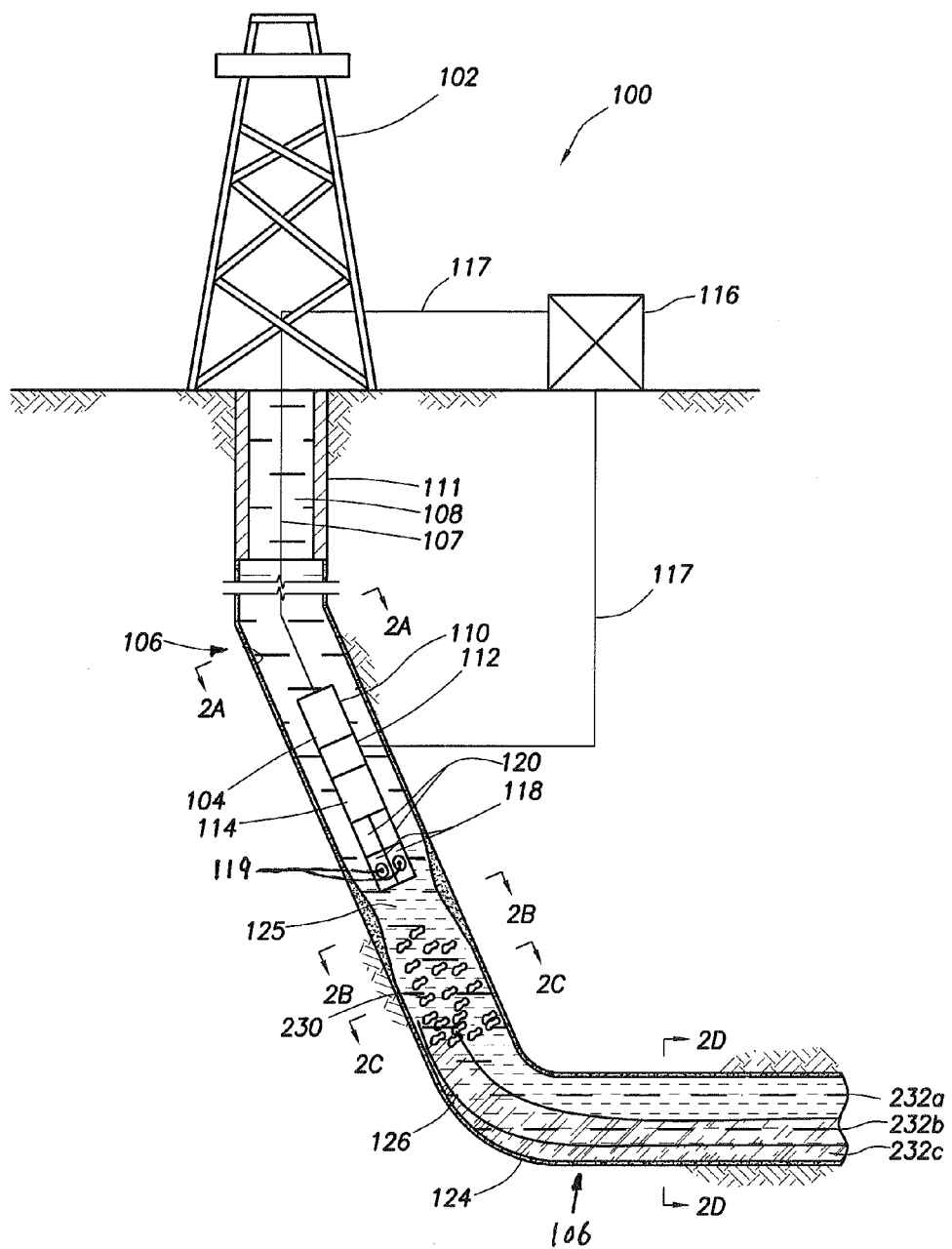
FIG. 1 is a schematic view of a system for generating downhole parameters, the system including a downhole tool having arms with sensors thereon and a surface unit.

FIG. 1 is a schematic view of a wellsite 100 having an oil rig 102 with a downhole tool 104 suspended into a wellbore 106 therebelow. The wellbore 106 has been drilled by a drilling tool (not shown), and a downhole fluid 108 has been pumped into the wellbore 106. As shown, a casing 111 has also been positioned in the wellbore 106 and cemented into place therein. The downhole tool 104 is depicted as being deployed into the wellbore by a wireline 107. Although the downhole tool 104 is shown as being conveyed into the wellbore 106 on the wireline 107, it will be appreciated that any suitable conveyance may be used, such as a slick line, a coiled tubing, a drill string, a casing string, or other downhole conveyance tool.

The downhole tool 104 may be provided with sensor pads 118 having one or more sensors 119 for measuring formation properties (i.e., formation sensors) extendable from the downhole tool 104 via arms 120 for taking downhole measurements. One or more arms 120 and/or sensor pads 118 may be located at several locations in the wellbore 106 for taking desired downhole measurements. The downhole tool 104 may also have various conventional downhole components, such as a logging tool 110, telemetry device 112, electronics 114, and other devices (not shown). The downhole tool 104 may communicate with a surface unit 116 via a communication link 117 with the wireline 107 and/or telemetry device 112. Downhole data gathered by the downhole tool 104 may be sent to the surface unit 116. The surface unit 116 may be provided with components to receive data from the downhole tool 104 (and/or other sources) and generate downhole parameters as will be described further herein.

The downhole fluid 108 (or mud or wellbore fluid) may be, for example, an oil-based downhole fluid or other conventional downhole fluid. In some cases, other components may be present in the downhole fluid, such as water, formation fluids, debris, additives, etc. The downhole fluid 108 may be distributed about the wellbore 106 in various patterns. For example, the downhole fluid 108 may have cuttings or other sediments that form a mudcake 124 along various portions of a wall 126 of the wellbore 106. A liquid portion 125 of the downhole fluid 108 may flow freely in the wellbore 106.

Various mixtures of the downhole fluid may be distributed about the wellbore at various depths as further shown in FIGS. 2A-2D. FIGS. 2A-2D depict cross-sections of the wellbore of FIG. 1 taken at different depths of the wellbore at lines 2A-2A, 2B-2B, 2C-2C and 2D-2D, respectively. These figures demonstrate possible fluid patterns that may result at various locations of the wellbore 106. One or more such patterns, such as homogenous, heterogeneous, separated, etc., and/or some combinations of the patterns illustrated in FIGS. 2B-2D may be present in one or more locations of the wellbore 106. The distribution of the downhole fluid may be a result of the content of the downhole fluid (e.g., oil-based mud, water, chemicals, etc.), the type of formation (e.g., sand, shale, etc.), the shape of the wellbore (e.g., vertical, deviated, etc.), agitation by movement of devices in the wellbore, etc.

As shown in FIG. 2A, the downhole fluid 108 may be evenly distributed, or homogenous, about the wellbore 106. For example, oil-based mud may be an emulsion of oil and water with a number of other additives that may be used to keep the emulsion from separating immediately, to change the density, or for other reasons. However, an oil-based mud may not remain completely emulsified. For example, small water-drops may float inside a continuous oil-phase portion of the downhole fluid. The water droplets may be so small and evenly distributed inside the oil-based mud that this emulsion may appear to be a fluid. The components of the downhole fluid, such as the water droplets, may have macroscopic electrical parameters, such as permittivity and conductivity (or fluid loss tangent or fluid impedivity). These electrical parameters may be a function of, for example, frequency, temperature, pressure etc. While there may be some separation within the downhole fluid, the downhole fluid may be considered homogeneous with respect to at least some of these parameters.

Although downhole fluid producers (or mixers) may attempt to provide stable, homogeneous downhole fluids, such fluids may become inhomogeneous (or heterogeneous). As shown in FIGS. 2B-2D, the downhole fluid 108 may be unevenly distributed, or heterogeneous, about the wellbore 106. In FIG. 2B, the downhole fluid 108 has formed a mud cake 124 along a wall 126 of the wellbore 106, but still has fluid portions 125 therein. Such a case may occur when, for example, an oil-based mud penetrates a distance into the formation. The formation may act generally as a filter, partially separating the oil-based mud emulsion and thereby changing electrical parameters of the portion of fluid entering the formation and the portion of fluid remaining in the wellbore 106 near the wall 126. The portion remaining in the wellbore forming the mud cake 124 may become very viscous or even solid.

As shown in FIGS. 2C and 2D, the downhole fluid may separate into various fluid components. In FIG. 2C, clumps 230 have formed in the downhole fluid 108 as a result of, for example, water or other fluids or materials settling in the downhole fluid 108. These clumps 230 may float within the fluid portion 125 of the downhole fluid 108. Clumps may form when, for example, water droplets present in the oil-based mud combine to form larger drops or bubbles. In another example, clumps may form when fluid(s) from the formation enter into the oil-based mud. In such cases, the downhole fluid may become inhomogeneous. This may occur even in cases where the oil-based mud has been designed to receive additional fluid without becoming inhomogeneous.

FIG. 2D shows downhole fluids that have separated into layers 232a-c along the wellbore 106 due to, for example, gravity. In the example depicted in FIG. 2D, a water layer 232c of downhole fluid 108 is positioned at a bottom portion of the wellbore 106 and an oil layer 232a of downhole fluid 108 is positioned at a top portion of the wellbore 106, with a mixed layer 232b therebetween. While FIG. 2D shows a full separation between layers, there may be a partial separation or a mix of fluids among the various layers.

This separation case may occur, for example, if the downhole fluid has an oil-water ratio that shifts at various locations. In other words, if the oil-water ratio changes with position, then the downhole fluid may be considered separated. In cases where significant separation has occurred, an interface between clear oil near the top (layer 232a) and oil-based mud therebelow (layer 232b) may be visible. Near the bottom (layer 232c), the downhole fluid 108 may have a higher water fraction. In general, water has a higher density than oil and, therefore, may descend to the bottom layer 232c while oil may ascend to the top layer 232a. With this so-called 'gravitational separation,' the oil-based mud may separate vertically with the oil/water ratio decreasing from top to bottom of a deviated or horizontal wellbore.

Figure 3A:
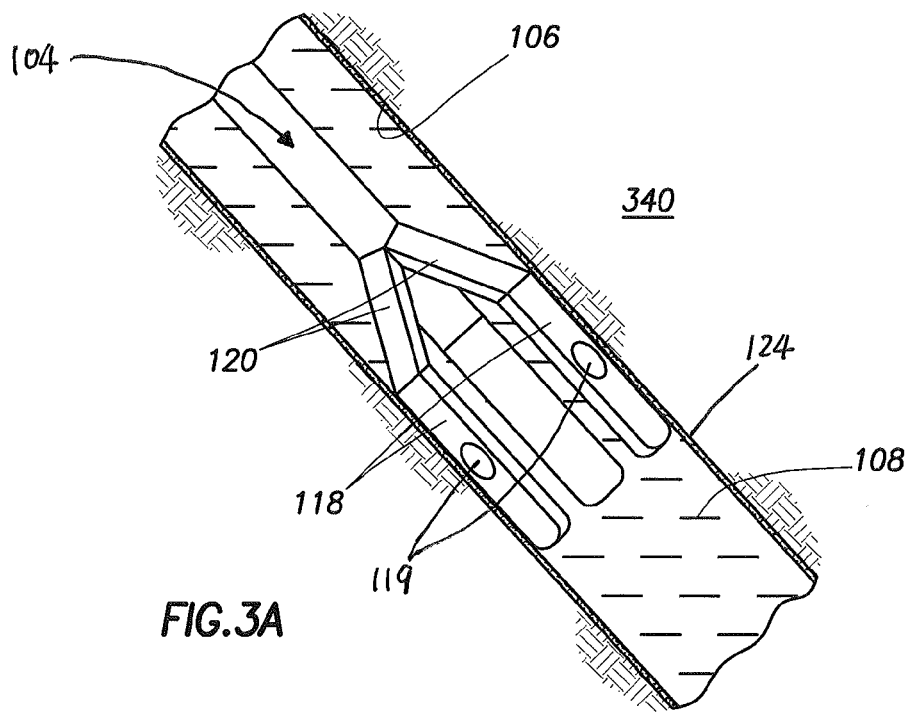
FIGS. 3A-3B depict portions of the downhole tool of FIG. 1 positioned in homogeneous and heterogeneous downhole fluid, respectively.
Figure 3B:
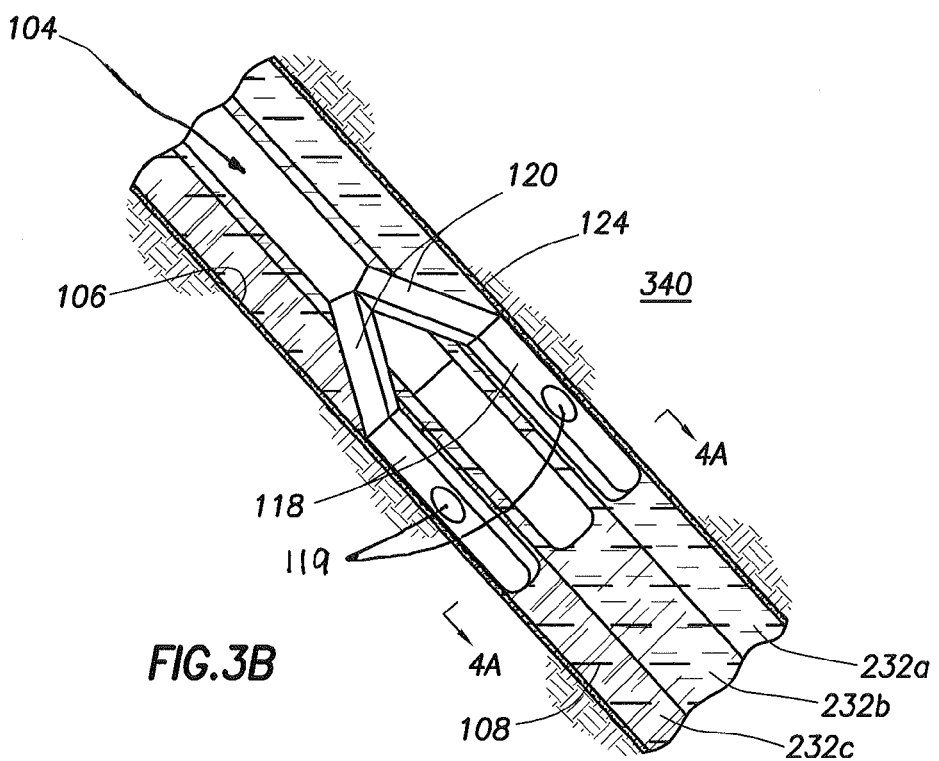

FIGS. 3A and 3B depict a portion of the downhole tool 104 in greater detail. FIG. 3A is a perspective view of the downhole tool 104 with the arms 120 extended such that the sensor pads 118 are adjacent the wall 124 of the wellbore 106 for measurement of the downhole fluid 108, using, e.g. downhole fluid sensor(s) or indirect measurements as described below in greater detail, and/or the subterranean formation 340 using, e.g. formation sensor(s) 119. The wellbore 106 as shown in FIGS. 3A and 3B is deviated (or slanted from vertical). In a deviated or horizontal well one side of the wellbore will point up (at an angle) and the opposite side will point down (at an angle).

The downhole tool 104 of FIG. 3A as shown is positioned in a portion of the wellbore 106 having a homogeneous downhole fluid 108 therein. FIG. 3B is a side view of the downhole tool 104 with the arms 120 extended such that the sensor pads 118 are adjacent the wall 124 of the wellbore 106 for measurement of the downhole fluid 108, e.g., using downhole fluid sensor(s) or indirect measurements as described below in greater detail, and/or the subterranean formation 340, e.g., using formation sensor(s) 119. The downhole tool 104 of FIG. 3B is positioned in a portion of the wellbore 106 having a separated, inhomogeneous downhole fluid 108 therein.

The one or more sensor pads 118 may be capable of collecting data relating to one or more downhole fluid parameters and/or one or more formation parameters. The one or more sensor pads 118 may determine the downhole parameters of the downhole fluid 108 and/or the subterranean formation 340 as the downhole tool 104 passes through the wellbore 106. The sensor pads 118 may be conventional sensor pads, such as those described in EP Patent No. EP2182391. The downhole tool 104 may be used to obtain measurements of the downhole fluid 108 and formation 340.

Figure 4B:
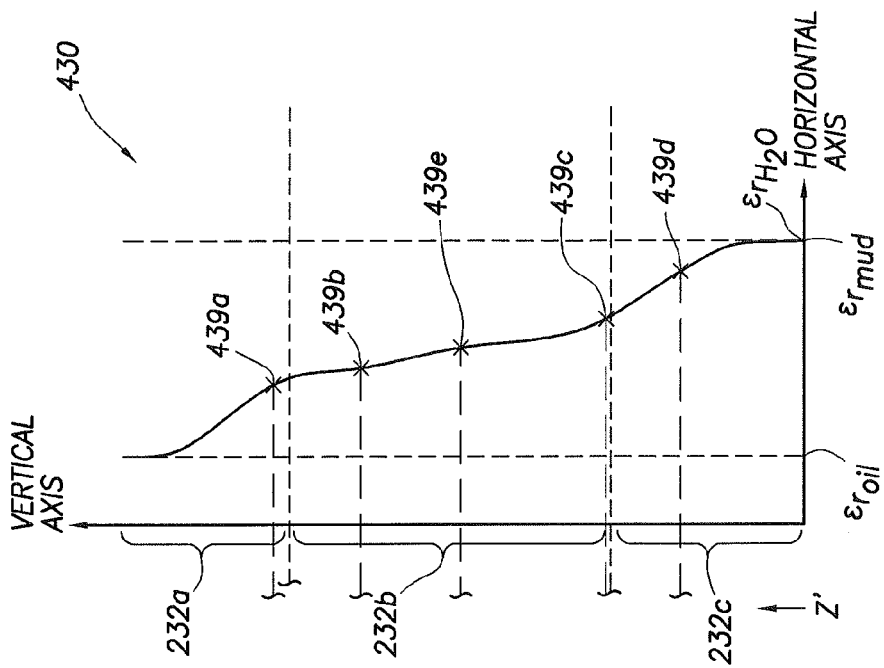
FIG. 4B is a plot of the downhole fluid in the wellbore of FIG. 4A.
Figure 4A:
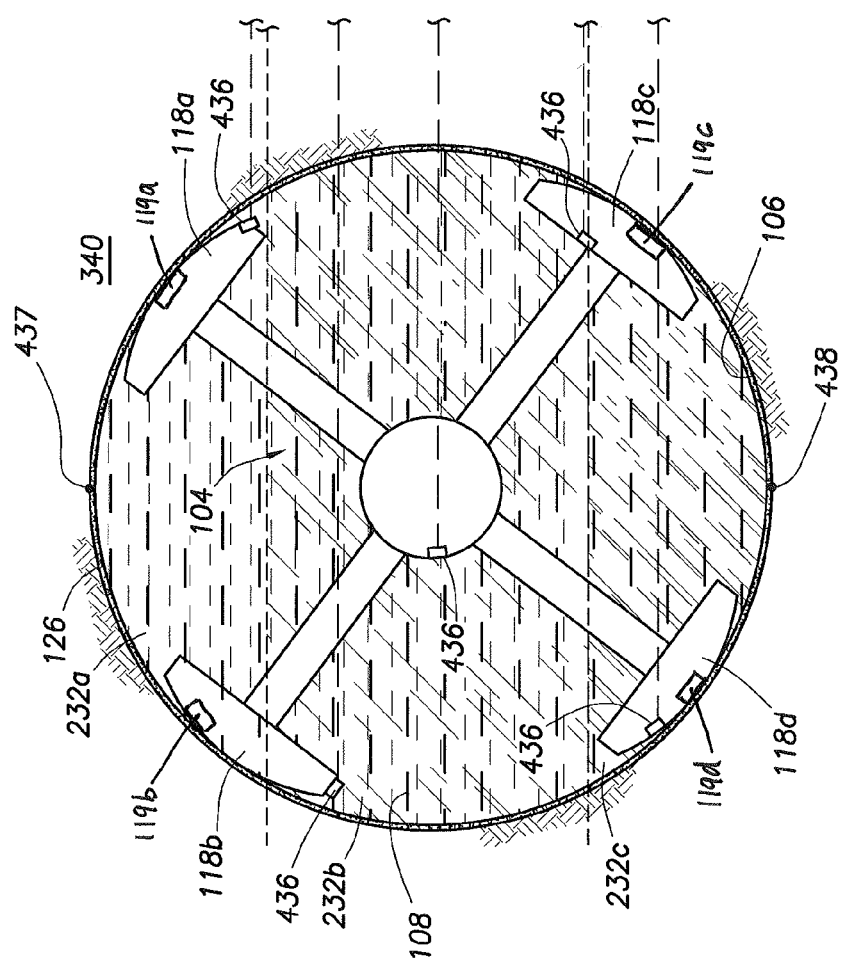
FIG. 4A is a cross-sectional view of the downhole tool of FIG. 3B taken along line 4A-4A.

FIG. 4A depicts a cross-sectional view of the downhole tool 104 of FIG. 3B taken along line 4A-4A. This cross-sectional view in FIG. 4A is perpendicular to a longitudinal axis of the wellbore 106 and shows the wall 126 of wellbore 106 roughly as a circle (depending on the actual shape of the hole). A point 437 on this circle which is farthest away from a center of the earth (or highest point) is called the 'top-of-hole.' The point 438 closest to the center of the earth (or lowest point) is called the 'bottom-of-hole.' A coordinate axis Z' points from point 438 to point 437.

The downhole tool 104 may have one or more sensor pads 118 positionable adjacent the wall 126 of the wellbore 106. As shown in FIG. 4A as an illustrative example, four sensor pads 118a-d each having a formation sensor 119a-d are positioned at various locations adjacent wall 126 of wellbore 106 for measurement of the formation 340. Additional sensors 436 may also be positioned about the downhole tool 104, for example, on one or more of the sensor pads 118 and/or the mandrel of the downhole tool 104, for taking various wellbore measurements, such as downhole fluid measurements including downhole fluid resistivity/conductivity, relative dielectric permittivity, pressure, temperature, composition, etc, and formation measurements including formation resistivity/conductivity, dielectric permittivity, density, porosity, permeability, etc. In some cases, one or more sensors 436 can be the various sensors for measuring downhole fluid parameters (i.e., downhole fluid sensors), such as those described in U.S. patent application Ser. No. 12/945,930, EP10290084.2, EP10290083.4. One or more sensors 436 may be positioned about various portions of the downhole tool 104 to take additional measurements for comparison, verification, supplementation or other use.

The additional sensors 436 may be used to provide supplemental data and/or to verify data collected by the sensor pads 118a-d. The sensor pads 118a-d and sensors 436 are preferably provided about downhole tool 104 to take measurements at various locations about the wellbore 106. Such sensor pads 118a-d and sensors 436 are depicted as being at the same axial location along the downhole tool 104 for consistent measurement at a given depth, but may also be provided at various depths as desired.

As further shown in FIGS. 4A and 4B, heterogeneous downhole fluid 108 has separated into fluid layers of mainly oil (232a), mainly water (232c) and a mixture of oil and water (232b) as previously described with respect to FIG. 2D. The sensor pads 118a-d are positioned in the wellbore 106 in various layers of the downhole fluid 108. Sensor pad 118a and a portion of sensor pad 118b are positioned in layer 232a. A portion of sensor pad 118b and a portion of sensor pad 118c are positioned in layer 232b. Sensor pad 118d is positioned in layer 232c. Each of the sensor pads 118a-d, therefore, may be exposed to various concentrations of downhole fluids 108 having varied electrical parameters. The variations in the downhole fluid may affect the measurements taken by sensor pads 118a-d and may require compensation as will be described further herein.

A corresponding profile 430 of the downhole fluid of FIG. 4A is depicted in FIG. 4B. The downhole fluid profile 430 is a graph of downhole fluid relative dielectric permittivity ($\in_r$) (horizontal axis) versus Z' coordinate (vertical axis) of the wellbore 106 of FIG. 4A. This graph depicts the relative dielectric permittivity of various portions of the downhole fluid and the possible separation of the downhole fluid 108 in the wellbore 106. In this example, points 439a-d correspond to the measurements taken by each downhole fluid sensor 436 disposed on respective sensor pads 118a-d; and point 439e corresponds to the measurement taken by the downhole fluid sensor 436 disposed on the mandrel. Profile 430 may be formed by interpolation and/or extrapolation using the points 439a-e. In some cases, other data points corresponding to measurements taken by one or more sensors for measuring formation/mud properties that are disposed on one or more sensor pads 118 may be used to construct the downhole fluid profile 430, such as described in U.S. patent application Ser. No. 12/945,928. In some cases, various combinations of selected measurements as described above may be used to construct the downhole fluid profile 430.

As an example shown in FIGS. 4A and 4B, the points 439a-d correspond to the location of each downhole fluid sensor 436 on the pads 118a-d; and the point 439e corresponds to the location of the downhole fluid sensor 436 on the mandrel. The vertical and horizontal coordinates of each point 439a-e relate to the Z' coordinate of the corresponding fluid sensor 436 and the relative dielectric permittivity $\in_r$ of the downhole fluid in the vicinity of that fluid sensor 436. The Z' coordinate may be determined using conventional positioning sensors and/or survey techniques.

While the profile of FIG. 4B depicts fluid parameter $\in_r$ along the horizontal axis, a conversion may be made to provide the profile in terms of oil/water ratio along the horizontal axis. The measurements depicted as points 439a-e which are downhole fluid dielectric measurements obtained from electrical signals (e.g., current, voltage, etc.) of fluid sensors 436 can be converted into oil/water ratios. In some cases, it may be desirable to know or predict the oil/water ratio at various points along the profile. The oil/water ratio may be determined based on empirical relationships between dielectric measurements of known drilling fluids and oil/water ratios of those known drilling fluids as described in Parimal A. Patil et al, "*An Experimental Study of Electrical Properties of Oil-Based Mud in the Frequency Range From* 1 *to* 100 *MHz*", SPE Drilling & Completion, September 2010. The mud dielectric permittivity may be determined based on the fluid sensor current amplitude or amplitude and phase At some intervals, water may become continuous where oil-drops are present. In such cases, the oil-based mud resistivity may 'break down,' or abruptly decrease by more than an order of magnitude. In other words the oil-based mud suddenly may become conductive. Thus, such a dramatic increase in mud resistivity can suggest that the dielectric measurements obtained in such situations may not be suitable for use to evaluate the oil/water ratio.

As shown in FIGS. 4A and 4B, the wellbore is deviated (or horizontal) causing the oil/water ratio to have a sloping profile extending from a top side of the wellbore 106 to a bottom side of the wellbore 106. In other words, the downhole fluid parameters and/or oil/water ratio may have a sloping profile with increasing Z'. This sloping profile can be used to determine the oil/water ratio of the downhole fluid 108 at various locations in the wellbore 106.

Downhole fluids 108 may have varied electrical parameters that may affect the measurements taken by the one or more formation sensors respectively positioned on the sensor pads 118a-d adjacent thereto. For example, the mud cake 124 may create a gap (or standoff, or mud standoff, or sensor standoff) between the one or more sensor pads 118 and the wall 126 of the wellbore 106. In some cases with inhomogeneous conditions as shown in FIGS. 2B-2D, it may be necessary to compensate for the influence of downhole fluids to prevent degradation of formation measurements and/or to obtain a good image of the resistivity variations of the formation 340. Additionally, the content of the downhole fluid adjacent each sensor pad 118 may have a different impact on the measurements. For example, oil-based downhole fluid may have a high resistivity in comparison to water. Thus, a sensor pad 118 positioned in an oil-based mud may measure differently than another sensor pad 118 positioned in water, or an oil-based mud having water clumps 230 therein. To address potential error due to these types of fluid conditions, it may be desirable to consider the effects of the varied downhole fluids adjacent the respective sensor pads 118a-d. It may also be desirable to selectively adjust the measurements to address these potential differences and/or potential error.

An understanding of the distribution of the downhole fluid in the well may be useful in correctly compensating for fluid variations and/or for interpreting, for example, the microresistivity images obtained. Some measurements may need adjustment, or may need to be deleted if the measurements fail to meet quality guidelines. For example, a measurement in layer 232c of the wellbore 106 taken by sensor pad 118d may be unusable while measurements in layers 232a-b taken by sensor pads 118a-c may be acceptable.

Figure 5:
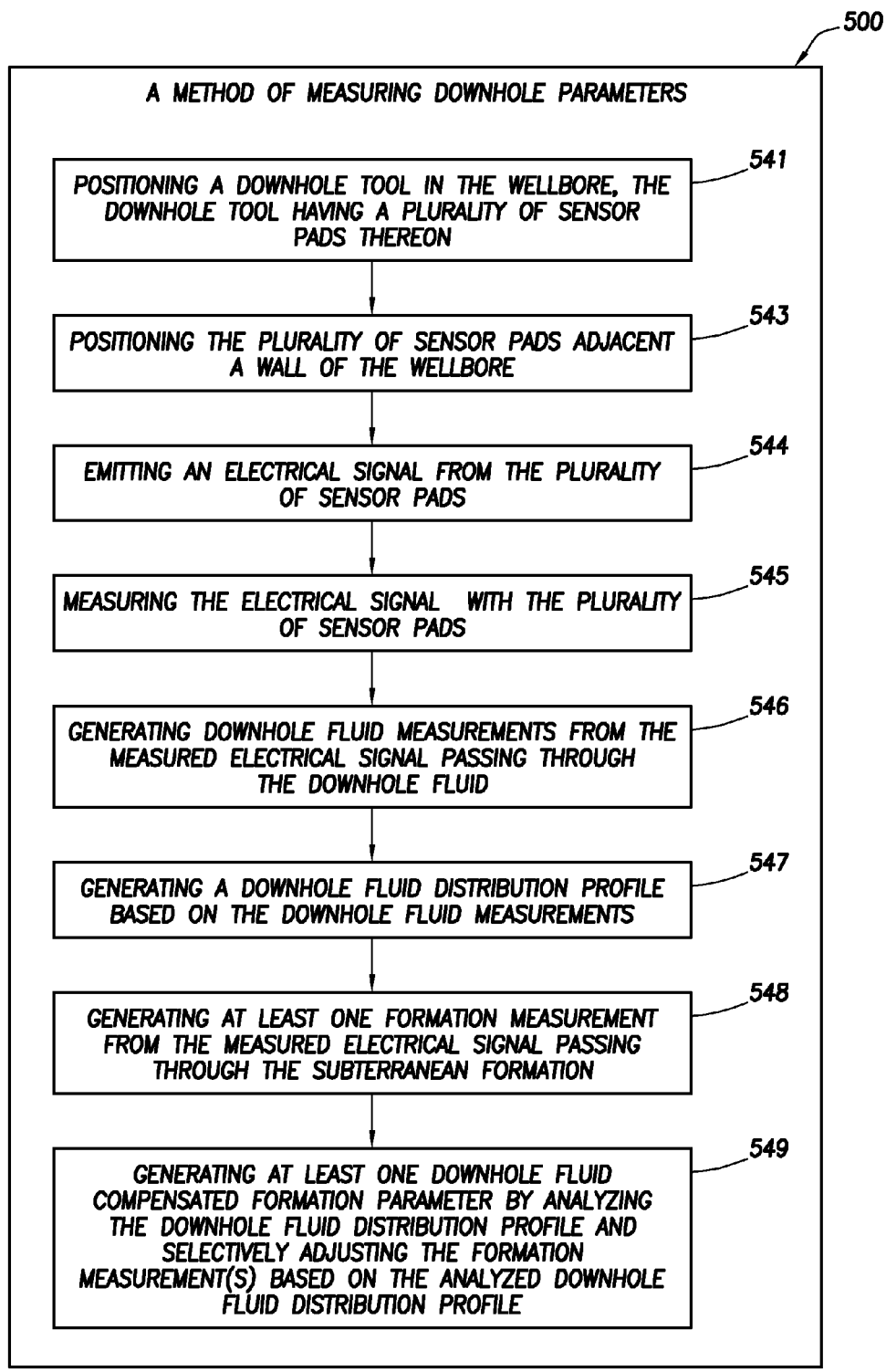
FIG. 5 is a flow chart depicting a method for generating downhole parameters

FIG. 5 is a flow chart depicting a method (500) of generating downhole parameters. The method involves positioning (541) a downhole tool in the wellbore, the downhole tool having a plurality of sensor pads thereon; positioning (543) the plurality of sensor pads adjacent a wall of the wellbore; emitting (544) an electrical signal from the plurality of sensor pads; and measuring (545) the electrical signal with the plurality of sensor pads. These steps may be performed using the downhole tool 104 and sensor pads 118 as described above. The sensor pads may be positioned at one or more positions along the wellbore wall 126.

The method may also involve generating (546) at least one downhole fluid measurement from the measured electrical signal. Generating may involve collecting and measuring (or quantifying) downhole fluid parameters. Electrical parameters of the downhole fluid may be obtained by a surface or an in-situ measurement. Downhole fluid parameters may be measured using conventional techniques, such as those described in EP Patent No. 2182391.

For a homogeneous downhole fluid, the downhole fluid (or mud) parameters may be measured anywhere in the wellbore, preferably under similar temperature and pressure conditions. However, for an inhomogeneous downhole fluid, the downhole fluid (or mud) parameters may be measured in close proximity to measurements taken of the formation 340 by a corresponding sensor pad 118. For example, multiple measurements may be taken of the formation 340 and/or downhole fluid 108 with the same sensor pad 118 at a given location in the wellbore 106.

Downhole fluid electrical parameters may change near an interface between the downhole fluid 108 and the formation 340, typically adjacent the wall 126 of the wellbore 106. Thus, fluid measurements may be taken as close as possible to the wall 126 without contacting the wall to capture the inhomogeneity of the fluid near the borehole wall without being substantially affected by the formation 340.

In some cases, downhole fluid parameters may be measured independently of the formation using, for example, one or more downhole fluid sensors (e.g., 436), such as those described in U.S. patent application Ser. No. 12/945,930, U.S. Ser. No. 12/945,928. In other cases, indirect downhole fluid measurements may be made where, for example, two measurements are made that respond in a different way to a combination of the downhole fluid and the formation electric parameters. Based on these two measurements one can determine a downhole fluid parameter (nearly) independent of the formation parameters and/or a formation parameter (nearly) independent of the downhole fluid. Obtaining a downhole fluid parameter this way can be considered an 'indirect' downhole fluid measurement. Examples of indirect measurements are described, for example, in U.S. Pat. No. 1,245,928. The indirect measurements may be used alone or in combination with direct downhole fluid measurements made using independent sensors.

Indirect downhole fluid measurements may rely on a so-called forward model which includes a model for the downhole fluid. If the downhole fluid has an inhomogeneous but steady profile, then the profile may be approximated, for example, with a linear or nonlinear function (optionally piecewise) of a fluid parameter (e.g., relative dielectric permittivity $\in_r$) vs. the Z' distance (e.g., as shown in FIGS. 4A and 4B) so as to provide a more accurate estimation of the downhole fluid and the formation parameters. Examples of suitable nonlinear functions may include polynomial, exponential, logarithmic, spline or the like.

Quantifying downhole fluid parameters may enable the use of downhole fluid parameters in a compensation technique of a formation measurement. For example, when measuring a resistivity parameter of the formation through a layer of downhole fluid, the electrical parameters of the downhole fluid may have a non-negligible influence on the formation measurements. If these electrical downhole fluid parameters are known, the formation measurements may be compensated by removing the downhole fluid effect from such measurements to generate more accurate formation measurements.

Downhole fluid measurements may also involve determining whether the downhole fluid is inhomogeneous and/or has separated. It may also be useful to quantify the degree of downhole fluid separation, since expected quality and fidelity of images obtained an oil-based mud imager may be linked to the degree of separation.

The method may also involve generating (547) a downhole fluid distribution profile (e.g., 430 of FIG. 4B) based on an analysis of the downhole fluid measurements generated (546) from the measured electrical signal of the sensor pads 118a-d. Typically, at least two measurements, such as resistivity/conductivity and dielectric permittivity or impedivity and fluid loss tangent or any combinations thereof, are taken by individual sensors or sensor pads at a given location. The electrical signal (e.g., current) measured at known positions along the wellbore (e.g., points 439a-e) may be interpolated to generate a profile in terms of fluid parameters (such as, for example, resistivity/conductivity, dielectric permittivity, loss tangent and/or oil/water ratio) as previously described with respect to FIG. 4B.

Multiple sensor pads (e.g., 118a-d) may be used to provide an estimate of the oil/water ratio profile to be made based on the azimuthal positions of these sensor pads 118a-d inside the wellbore 106. One or more sensor pads may be positioned at one or more locations in the wellbore 106. The orientation of the downhole tool 104 in the wellbore 106 may be measured using, for example, conventional accelerometers and/or magnetometers (not shown). Together with measured/estimated arm openings and tool geometry, the azimuthal positions of the sensor pads 118 can be determined. Further a full 3D position can be determined, if desired, by including tool depth and well-site location information.

Two downhole fluid sensor pads 118 with a different distance to top-of-hole (point 437) may be sufficient to determine a difference in downhole fluid and, therefore, a likely difference in oil/water ratio. For other positions inside the wellbore 106, interpolation and/or extrapolation may be used to obtain an estimation of the oil/water ratio profile. Additional sensors (e.g., 436) may be distributed across the wellbore 106 to provide enhanced profiles. For the downhole fluid parameters or oil/water ratio at any position where there is no sensor, interpolation, extrapolation and/or a model may be used. Where extrapolation of dielectric permittivity is used, an assumption may be made that the relative dielectric permittivity may not decrease beneath that of the pure oil (between about 2 and 4) used in the oil-based mud. Similarly, an assumption may also be made that the relative dielectric permittivity may not increase above that of water (about 80) used in the oil-based mud.

In cases where a steady oil/water ratio profile exists, the downhole fluid measurement may be assumed to monotonically increase or decrease from the bottom-of-hole (point 438) downhole fluid measurement to the top-of-hole (point 437) downhole fluid measurement. The steady profile may be used in a compensation technique whereas a randomly varying profile may not be easily usable. Also, in a steady profile a continuous water-phase may be near the bottom, potentially making the bottom measurement (such as those taken by sensor pad 118d) unusable while leaving the side and top measurements (such as those taken by sensor pads 118a-c) intact. A missing bottom measurement may potentially be replaced by a bottom measurement using a conventional sensor for conductive mud.

In cases where the formation measurement sensors have a downhole fluid measurement in close proximity, then the construction of a downhole fluid parameter profile may provide a reasonable estimation of the downhole fluid parameters near the formation sensors. Also, an accurate determination of the average oil/water ratio in the well 106 may be made at a given depth which may have locally changed due to fluid-interaction with the formation 430.

Measurements of individual downhole fluid sensors or sensor pads may be taken at a given azimuthal position in the wellbore. As a measurement is logged at a given time, the measurements may change due to fluid movement or fluid condition changes (e.g., temperature changes). The variations observed over time may give an estimate of the stability of the downhole fluid. Further, as the downhole tool 104 moves through the wellbore 106, electrical downhole fluid parameters may be measured at various depths. These measurements may be used to construct downhole fluid parameter depth profiles or oil/water ratio depth profiles (e.g., 430 of FIG. 4B) again through interpolation and extrapolation. Based on these depth profiles the formation measurement may be compensated differently at different time and depth.

The method may also involve generating (548) at least one formation measurement from the measured electrical signal. These measurements may be performed similar to those of step (546), except that the sensor pads pass current through the formation rather than just the downhole fluid. Finally, the method may involve generating (549) at least one downhole fluid compensated formation measurement by analyzing the downhole fluid distribution profile and selectively adjusting the formation measurement based on the analyzed downhole fluid distribution profile. This may involve adjusting formation measurements based on information gathered. For example, in the case illustrated in FIGS. 4A and 4B, sensor pads 118a, 118c and 118d and corresponding sensors 436 respectively disposed on those pads and sensor 436 disposed on the tool mandrel can be used to provide the downhole fluid profile (e.g., fluid loss tangent as a function of the Z' coordinates of sensors/pads). The downhole fluid parameter (e.g., loss tangent, relative dielectric permittivity) for sensor pad 118b can then be determined from the downhole fluid profile by interpolation. With the determined downhole fluid parameter, formation measurements taken by sensor pad 118b (e.g., using formation sensor 119b) can be compensated as described herein, for example, when no fluid sensor (e.g., 436) is present on sensor pad 118b. As another example, sensor pads 118b, 118c and 118d and corresponding sensors 436 respectively disposed on those pads and sensor 436 disposed on the tool mandrel can be used to provide the downhole fluid profile. The downhole fluid parameter for sensor pad 118a can then be determined from the downhole fluid profile by extrapolation. With the determined downhole fluid parameter, the formation measurements taken by the sensor pad 118a (e.g., using formation sensor 119a) can be compensated as described herein, for example, when no fluid sensor is present on sensor pad 118a. In some cases, sensor pads 118 may not measure as expected due to separation of an oil-based mud, compositional adjustments can be made to the oil-based mud in use or to the oil-based muds for future wells to reduce the chance of separation. If no separation occurs, operating parameters (e.g., mud composition) may be adjusted, for example, by providing smaller quantities of emulsifiers to potentially save cost or reduce environmental impact etc.

Depending on the quality of the measurements, it may be necessary to remove or adjust some data. Each measurement typically comes with some measurement accuracy. The measured value may have no or very little meaning (contain limited information) if the accuracy of the measured value is very low. For a formation measurement that is known to be affected by a downhole fluid in a specific way, it is possible to link the accuracy of the formation measurement to the accuracy of the knowledge of certain electrical downhole fluid parameters. For example, the uncertainty in an orthogonal component of the button impedance can be linked through a formula to an accuracy of the downhole fluid impedance phase angle for a given variation in standoff. In such a case, if the accuracy of the downhole fluid angle is about +/−2.0 degrees and the variation of the standoff is about 3.0 mm+/−1.0 mm, then the variation in the orthogonal component of the button impedance may be about +−20% for some given bulk formation resistivity.

The absolute values of the electrical parameters of oil-based mud may be determined as a function of time and position, the uncertainty in these parameters calculated and the uncertainty propagated to a final measurement accuracy. In other words, the downhole fluid in front of one pad may be either good or bad, thereby making the formation measurement of this sensor pad either good or bad. The downhole fluid may be classified in n-categories leading to a formation measurement with n possible qualities. Continuing there may result a formation measurement with a detailed computed accuracy value attached.

Other compensations may be made, for example, using a measurement of a downhole fluid electric parameter to compensate a formation measurement such that the measurement becomes independent of the downhole fluid as described in EP Patent No. 2182391. In this example, the phase angle of the downhole fluid (which can be obtained from the conductivity or fluid loss tangent and the dielectric permittivity of the downhole fluid) may be used to compensate a raw impedance measurement in order to obtain a formation parameter independent of the downhole fluid.

In another example, the fluid and/or formation measurements may be analyzed to determine whether compensation may be needed. For cases where profiles are based on a relationship between downhole fluid dielectric permittivity and downhole fluid conductivity (or fluid loss tangent or fluid impedivity or fluid impedivity phase angle) or oil/water ratio, the relationship may be examined to verify proper correspondence. If not, the data may be selectively excluded when an out of expected range measurement indicates a bad correspondence has been made.

Figure 6:
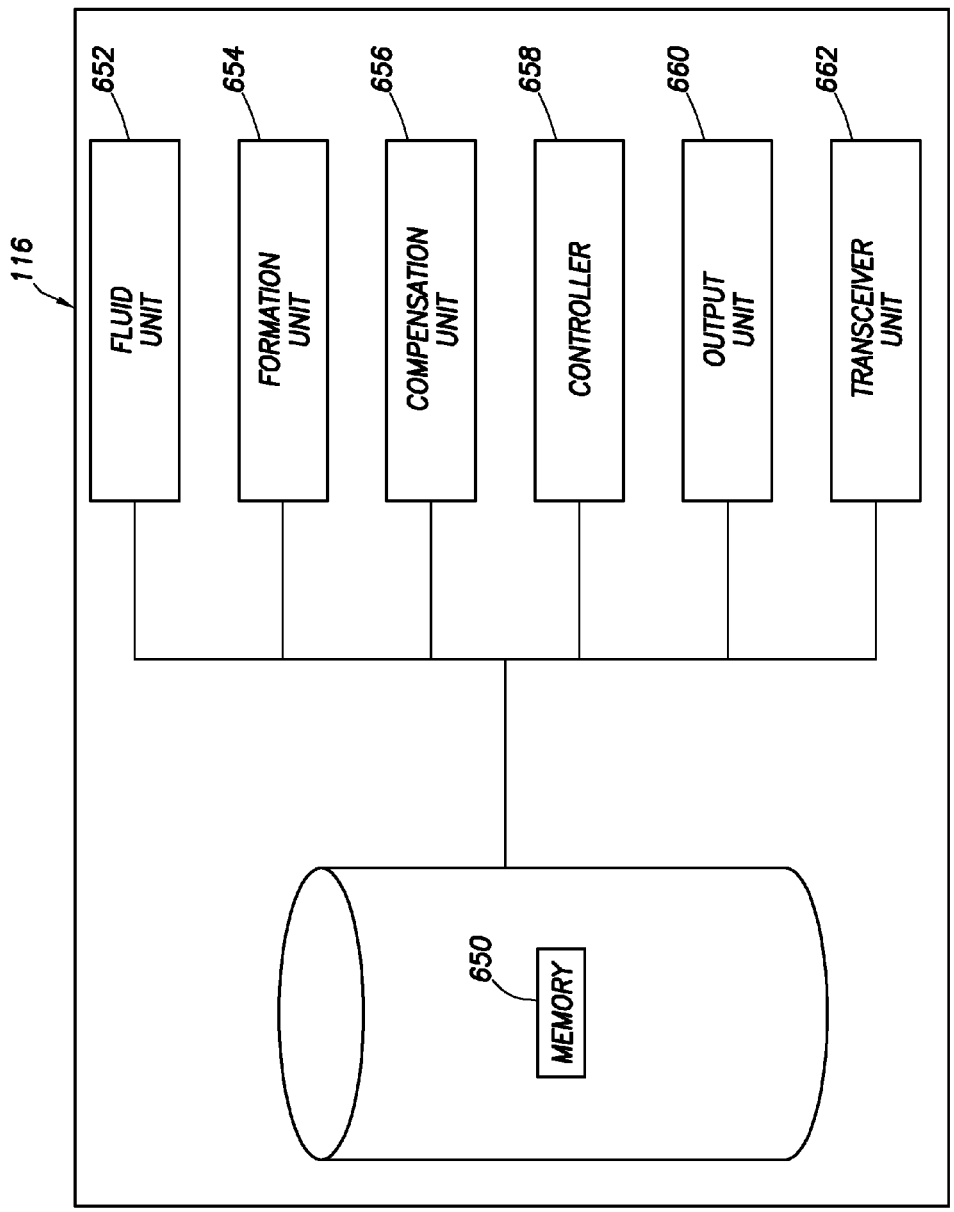
FIG. 6 is a schematic diagram depicting the surface unit in greater detail.

FIG. 6 depicts a block diagram illustrating the surface unit 116 of FIG. 1 in greater detail. While the surface unit 116 is depicted as a single entity at the wellsite, part or all of the surface unit 116 may be located on or off the wellsite 100. The surface unit 116 may be used in combination with the downhole tool 104 to generate various downhole parameters. For example, the surface unit 116 may be used to collect downhole measurements of, for example, downhole fluids and/or subterranean formations. The measurements may be used to generate compensated downhole measurements of subterranean formations.

The surface unit 116 may take the form of an entirely hardware embodiment, an entirely software embodiment (including firmware, resident software, micro-code, etc.), or an embodiment combining software and hardware aspects. Embodiments may take the form of a computer program embodied in any medium having computer usable program code embodied in the medium. The embodiments may be provided as a computer program product, or software, that may include a machine-readable medium having stored thereon instructions, which may be used to program a computer system (or other electronic device(s)) to perform a process. A machine readable medium includes any mechanism for storing or transmitting information in a form (such as, software, processing application) readable by a machine (such as a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. Embodiments may further be embodied in an electrical, optical, acoustical or other form of propagated signal (e.g., carrier waves, infrared signals, digital signals, etc.), or wireline, wireless, or other communications medium. Further, it should be appreciated that the embodiments may take the form of hand calculations, and/or operator comparisons. To this end, the operator and/or engineer(s) may receive, manipulate, catalog and store the data from the downhole tool 104 in order to perform tasks depicted in the surface unit 116.

The surface unit 116 may include a storage device (or memory) 650, a fluid unit 652, a formation unit 654, a compensation unit 656, a controller 658, an output unit 660, and a transceiver unit 662. The storage device 650 may be any conventional database or other storage device capable of storing data associated with the wellsite 100 shown in FIG. 1. Such data may include, for example current frequencies, current time and/or location sent, downhole fluid parameters, formation parameters, historical data, depths, formation models, and the like. The compensation unit 656 may be any conventional device, or system, for performing calculations, derivations, predictions, analysis, interpolation, and/or extrapolation, such as those described herein. The output unit 660 may be one or more displays, printers, or other devices capable of generating reports, images or other outputs. The transceiver unit 662 may be any conventional communication device capable of passing signals (e.g., power, communication) to and from the surface unit 116.

The fluid unit 652 and formation unit 654 may be used to collect, analyze, process and otherwise manipulate data from the wellsite. The fluid unit 652 may be used to collect measurements, such as current from the sensor pads 118, relating directly to the downhole fluid in the wellbore. These measurements may be used to generate a plot as shown in FIG. 4B using the fluid unit 652 and/or the compensation unit 656. This information may be analyzed to determine the effects of the downhole fluids in the wellbore. For example, measurements taken by multiple sensing pads 118 and/or sensors 436 may be compared to determine if certain measurements may be adversely affected by the downhole fluids. In such cases, suspect measurements may be identified as suspect and considered for compensation.

The formation unit 654 may be used to collect measurements, such as current from the sensor pads 118, relating directly to the subterranean formation 340. This information may be analyzed with the measurements taken of the downhole fluids in the wellbore in close proximity thereto using the formation unit 654 and/or the compensation unit 656. In cases where formation measurements are taken near suspect downhole fluid measurements, such formation measurements may be adjusted based on adjacent fluid measurements (e.g., using interpolation and/or extrapolation), or removed from the data pool using the compensation unit 656. In this manner, the formation measurements may be compensated based on suspect downhole fluid measurements.

Variations, modifications, additions and improvements of the invention are possible. For example, one or more sensor pads and/or sensors may be positioned about the downhole tool to make desired measurements.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components.

What is claimed is:

1. A system for generating downhole parameters of a wellbore penetrating a subterranean formation and having a downhole fluid therein, comprising:
   a downhole tool positionable in the wellbore;
   a plurality of sensor pads positionable axially about the downhole tool and spaced at a distance from the downhole tool, wherein each sensor pad of the plurality of sensor pads is configured to emit an electrical signal therefrom and to measure the electrical signal; and
   a downhole fluid unit for generating, at different locations along the wellbore, a plurality of downhole fluid measurements from the measured electrical signal passing through the downhole fluid in situ and generating a downhole fluid distribution profile based on the plurality of downhole fluid measurements, an orientation of the wellbore, and a position of the sensor pad corresponding to each of the downhole fluid measurements, whereby separation of the downhole fluid may be indicated.

2. The system of claim 1, further comprising a formation unit for generating at least one formation measurement from the measured electrical signal passing through the subterranean formation.

3. The system of claim 2, further comprising a compensation unit for analyzing the plurality of downhole fluid measurements and the downhole fluid distribution profile and selectively adjusting the at least one formation measurement based on the analyzed downhole fluid distribution profile whereby a fluid compensated formation parameter is provided.

4. The system of claim 1, further comprising at least one sensor for measuring at least one wellbore measurement, wherein the at least one wellbore measurement is one of at least one electrical, acoustic, nuclear, temperature, and pressure.

5. A method for generating downhole parameters of a wellbore penetrating a subterranean formation and having a downhole fluid therein, comprising:
   positioning a downhole tool in the wellbore, the downhole tool having a plurality of sensor pads depending therefrom;
   positioning the plurality of sensor pads adjacent a wall of the wellbore, in an axial plane of the wellbore, the plurality of sensor pads being spaced at a distance from the downhole tool;
   emitting an electrical signal from each of the plurality of sensor pads;
   measuring the electrical signal with each of the plurality of sensor pads;
   generating, at different locations along the wellbore, a plurality of downhole fluid measurements from the measured electrical signal passing through the downhole fluid as a function of wellbore orientation, the plurality of downhole fluid measurements being generated without intake of the downhole fluid; and
   generating a downhole fluid distribution profile based on the plurality of downhole fluid measurements and locations at which the electrical signals are measured.

6. The method of claim 5, further comprising generating at least one formation measurement from the measured electrical signal passing through the subterranean formation.

7. The method of claim 6, further comprising generating at least one downhole fluid compensated formation measurement by analyzing the downhole fluid distribution profile and selectively adjusting the at least one formation measurement based on the analyzed downhole fluid distribution profile.

8. The method of claim 7, wherein the step of generating at least one downhole fluid compensated formation parameter comprises determining if any of the plurality of downhole fluid measurements is outside of an expected range and selectively deleting any of the plurality of downhole fluid measurements that is outside of an expected range.

9. The method of claim 7, wherein the step of generating at least one downhole fluid compensated formation parameter comprises repeating the steps of the method at a new location in the wellbore.

10. The method of claim 7, wherein the step of generating at least one downhole fluid compensated formation parameter comprises changing the sensor pads and repeating the steps of the method.

11. The method of claim 5, further comprising measuring at least one wellbore measurement with at least one sensor.

12. The method of claim 5, wherein the step of generating a plurality of downhole fluid measurements comprises performing an indirect measurement of the downhole fluid.

13. The method of claim 5, wherein the step of generating a plurality of downhole fluid measurements is performed over time.

14. The method of claim 5, wherein the step of generating a downhole fluid distribution profile comprises converting the electrical signal into a fluid loss tangent.

15. The method of claim 5, wherein the step of generating a downhole fluid distribution profile comprises converting the electrical signal into an oil/water ratio.

* * * * *